Jan. 8, 1929.
H. O. HENDRICKSON
1,698,436
GRAIN DUSTING APPARATUS
Filed Oct. 25, 1926
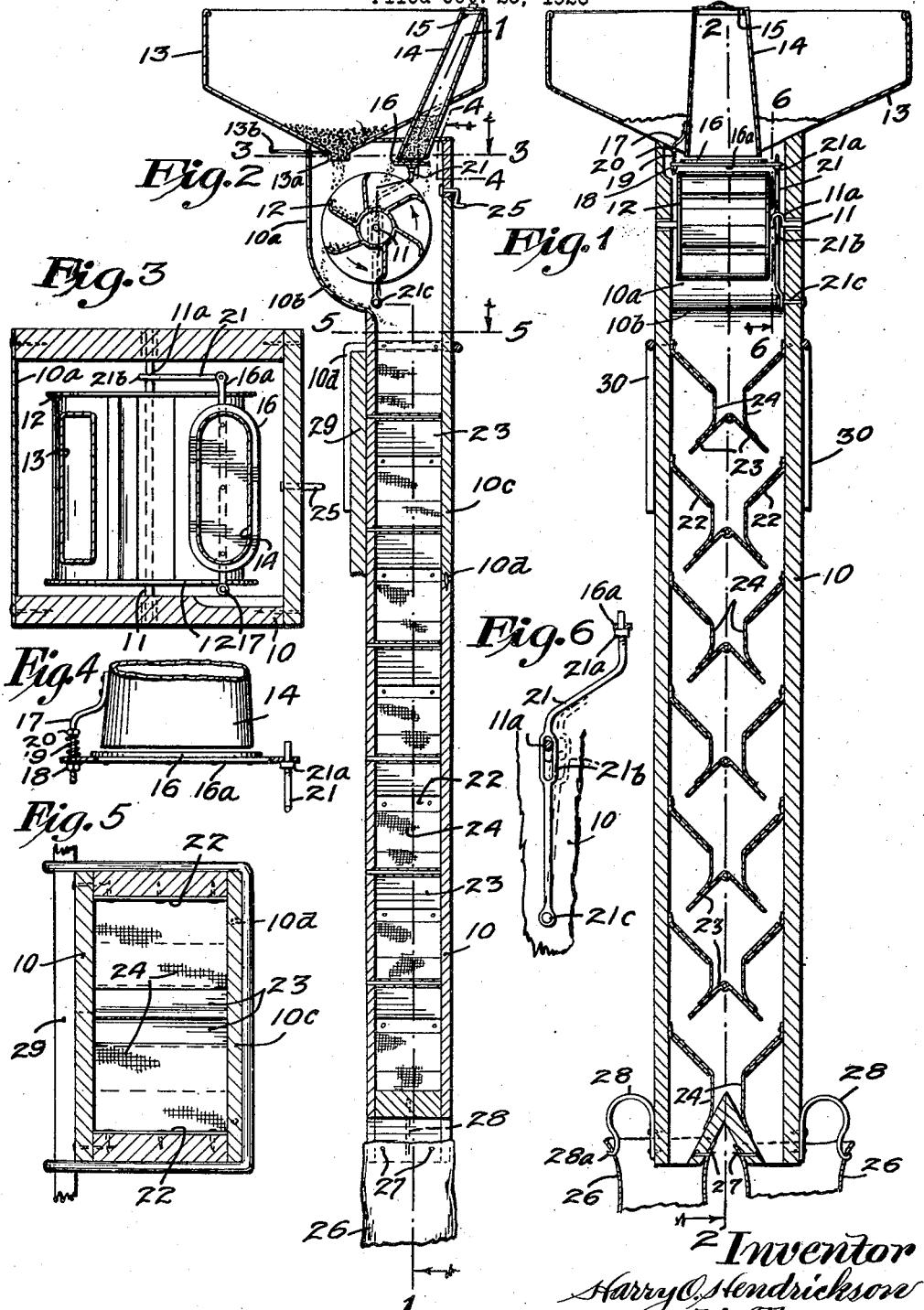
Inventor
Harry O. Hendrickson
By his Attorneys Patented Jan. 8, 1929.

1,698,436

UNITED STATES PATENT OFFICE.

HARRY O. HENDRICKSON, OF HOMESTEAD, MONTANA.

GRAIN-DUSTING APPARATUS.

Application filed October 25, 1926. Serial No. 143,910.

This invention relates to a grain dusting apparatus. It is more or less a common practice to dust the grain with certain chemicals to prevent smut and other grain diseases, and the chemicals are often applied in the form of a fine dust. One of such chemicals commonly used is copper carbonate. It is desirable to thoroughly mix the dust and grain so that the grain is effectively coated with the dust.

It is an object of this invention, therefore, to provide a very simple and efficient grain dusting apparatus through which the grain passes by gravity.

It is another object of the invention to provide a grain dusting apparatus comprising a chute through which the grain and dust pass by gravity, said chute having mixing devices therein and the grain and dust being fed into said chute from receptacles respectively disposed above said chute.

It is a further object of the invention to provide a grain dusting apparatus comprising a chute, a grain hopper disposed above the chute and a grain distributing member in said chute operated by the falling grain, a dust receptacle being disposed above said chute having a feeding means preferably operated from said distributing member.

It is still another object of the invention to provide a method of mixing grain and dust such as copper carbonate, which consists in discharging the grain and letting it fall through a casing by gravity, distributing the grain and dust in said casing to mix the same and feeding the dust by the action of the falling grain.

These and other objects and advantages of the invention will be fully set forth in the following description made in connection with the accompanying drawings, in which like reference characters refer to similar parts throughout the several views and in which:—

Fig. 1 is a vertical section through the apparatus, taken substantially on line 1—1 of Fig. 2;

Fig. 2 is a vertical section through the apparatus, taken substantially on line 2—2 of Fig. 1;

Fig. 3 is a horizontal section taken on line 3—3 of Fig. 2;

Fig. 4 is a vertical section taken on line 4—4 of Fig. 2;

Fig. 5 is a horizontal section taken on line 5—5 of Fig. 2; and

Fig. 6 is a vertical section taken on line 6—6 of Fig. 1.

Referring to the drawings, the device comprises a vertically disposed chute 10. While this chute may be variously formed, in the embodiment of the invention illustrated it is shown as rectangular in horizontal cross section and as having a widened portion $10^a$ at its upper end having a side $10^b$ curved downwardly and inwardly at its lower portion toward the chute. Extending across the chute and having its ends journaled therein, is a shaft 11 having a crank portion $11^a$ adjacent one end. Secured to the shaft 11 is a vaned wheel 12 having radially extending vanes having their ends curved somewhat circumferentially, said wheel and the vanes thereof extending substantially across the chute as shown in Fig. 1. A hopper or receptacle 13 is mounted above the portion $10^a$ of the chute adapted to contain grain, said hopper having a discharge passage and opening $13^a$ disposed above one side of the wheel 12, which opening is controlled by a slide $13^b$. Another receptacle 14 is disposed above chute 10 extending partially through hopper 13, which receptacle 14 has its sides diverging downwardly and said receptacle preferably is provided with a handle equipped lid or cover 15. The lower portion of the receptacle 14 is also disposed above wheel 12 and a plate 16 extends across the open lower end of chute 14, being spaced a short distance therebelow. A bar $16^a$ is secured to and extends across plate 16, having an aperture at one end through which extends a bracket 17 secured at its upper end to the side of receptacle 14 and having its lower end projecting vertically downward and threaded. A nut 18 is disposed on the lower end of bracket 17 supporting bar $16^a$ and a coiled spring 19 surrounds bracket 17 above bar $16^a$, bearing at its lower end on said bar and engaging at its upper end with a nut 20 also carried on bracket 17. As shown in Fig. 3 both receptacle 14 and plate 16 are oblong in plan. The other end of bar $16^a$ has an aperture therein through which extends the upper end of lever 21, said lever having an enlarged shoulder forming nut $21^a$ adjacent its upper end on which bar 16 rests. The lever 21 extends downwardly and laterally and has an open or looped portion $21^b$ surrounding the crank portion $11^a$ of shaft 11, said lever being pivoted at $21^c$ to the side of the chute 10 some distance below wheel 12.

The chute 10 as shown extends downwardly quite a long distance below wheel 12 and said chute has secured therein a plurality of oppositely inwardly and downwardly extending plates 22 secured to the sides of the chute, said plates being spaced a comparatively short distance apart at their inner edges. Beneath each pair of plates 22 is a pair of centrally disposed outwardly and downwardly inclined plates 23 meeting at their upper edges and forming a sharp ridge extending across said chute. Plates 23 may conveniently be supported on rods 23ª extending therebeneath and engaging the sides of the chute. The plates 22 have flexible aprons 24 of sheet material such as heavy canvas secured thereto, which aprons depend downwardly and have their lower portions overlying the top of the plates 23. The chute 10 has a removable side panel 10ᶜ having pins 10ᵈ at its lower edge adapted to seat in the adjacent portion of the chute, said panel being normally held in position in alinement with the sides of the chute by any suitable latch 25 at its upper end, said latch being shown as revolubly mounted in the chute above said panel and being in the form of a small crank shaft. The chute 10 has openings at either side below the lower members 23 and is arranged to have bags 26 detachably held thereon at its lower end. For this purpose the chute has a pair of pins 27 at each side carried by each side of the lower member 23 and further has bowed spring arms 28 secured thereto at each side having hook portions 28ª at their terminals over which the edges of the bags are engaged. The device is adapted to be carried along the side of a wagon body such as shown in section in Fig. 2 as 29, and a supporting member 30 is provided formed as a yoke, extending about three sides of the chute and having its ends 30ª bent downwardly at a right angle to extend along the sides of the body 29, thereby holding the chute in position against said body, the member 30 binding against the chute and frictionally holding it against the body.

In operation the grain will be placed in hopper 13 and the copper carbonate dust in receptacle 14. The slide 13ᵇ being open, the grain will flow through the discharge opening 13ª and will fall upon the vanes of wheel 12, it being noted that the vanes are curved upwardly at the side of the wheel on which the grain falls. The wheel 12 will thus be rotated and will act to distribute the grain which will drop from the wheel on to the curved portion 10ᵇ of the chute and slide therefrom into the chute. As wheel 12 is rotated, the crank shaft 11 will be rotated and the crank portion 11ˢ thereof will oscillate lever 21 about its pivot 21ᶜ. The upper end of lever 21 will thus oscillate bar 16ª and plate 16 and dust will pass from the lower end of receptacle 14 over the edges of the plate 16 and downwardly into chute 10. This dust will drop on the wheel 12 and will be initially mixed with the grain thereon and discharged with the grain into the chute. The distance of the plate 16 from the bottom of receptacle 14 may be varied as desired to control the amount of dust fed by the adjustment of the nut 18. The grain and dust drop into the chute 10 and are directed by the plates 22 toward the center thereof. The grain and dust then fall on to the inclined plates 23 and are directed outward toward the sides of the chute. This action is successively repeated by the plates 22 and 23 so that the grain is thoroughly agitated and distributed. As the grain rolls or slides over the plates 23, it passes under the aprons 24. These aprons act to retard the grain and roll it over. The aprons will become charged with the dust and the grain is thus thoroughly agitated and mixed or coated with the dust. The aprons also act to prevent the grain falling too rapidly through the chute. The grain is thus discharged at the bottom of the chute in thoroughly coated condition and is received in the bags 26. As stated, the device is adapted to be carried on the side of the wagon body and it can be quickly and easily applied thereto and adjusted as desired, by means of the member 30.

From the above description it is seen that applicant has provided a very simple and efficient grain dusting apparatus. The device is quite easily and inexpensively constructed, and it is readily portable and very rugged and durable. The device has been amply demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:

1. A device for dusting grain having in combination, a casing, means for feeding grain through said casing by gravity, a receptacle adapted to contain the dust, a feeding means for said dust, and means operated by the falling grain in said casing for actuating said feeding means.

2. The method of mixing grain and dust such as copper carbonate which consists in dropping the grain and letting it fall through a casing by gravity, distributing the grain and dust in said casing to mix the same and feeding said dust by the action of said falling grain.

3. A grain dusting apparatus having in combination, a chute into which the grain is discharged, a grain hopper above said chute having a discharge passage, a distributing means for said grain in said chute beneath said discharge passage and revoluble about a horizontal axis, a dust receptacle above said chute, a feeding means for feeding dust from said receptacle and means in said chute for distributing, retarding and mixing said grain and dust.

4. A grain dusting apparatus having in combination, a chute into which the grain is discharged, a grain hopper above said chute having a discharge passage, a vaned wheel journaled in said chute having one side beneath said discharge passage, a receptacle for dust having a discharge opening above said wheel, deflecting means for the grain in said chute and flexible means co-operating with said deflecting means to coat the grain with dust.

5. A grain dusting apparatus having in combination, a chute into which the grain is discharged, a grain receptacle constructed and arranged to discharge into said chute, a dust receptacle constructed and arranged to feed dust into said chute, deflecting means having oppositely outwardly and downwardly sloping surfaces, retarding deflecting means having oppositely inwardly and downwardly sloping surfaces below said surfaces and receiving therefrom, and flexible aprons overlying certain of said surfaces whereby the grain rolls or slides between said aprons and said surfaces.

6. A grain dusting apparatus having in combination, a chute into which the grain is discharged, a grain receptacle constructed and arranged to discharge into said chute, a dust receptacle constructed and arranged to feed dust into said chute, oppositely disposed plates extending inwardly and downwardly from the sides of said chute, and spaced at their lower ends, plates beneath said plates extending outwardly and downwardly from a meeting line substantially at the center of said chute and spaced from the sides thereof, flexible aprons secured to said first mentioned plates depending therefrom and lying against said last mentioned plates whereby the grain and dust will pass between said aprons and said last mentioned plates.

7. A grain dusting apparatus having in combination, a chute, a shaft extending thereacross and journaled therein having a crank portion thereon, a grain propelled wheel upon said shaft, a grain hopper above said chute having a discharge opening above said wheel, a dust receptacle above said chute having a discharge outlet above said wheel, a reciprocating feeding means for said dust receptacle, and a connection between said crank portion of said shaft and said feeding means for actuating the latter.

8. The structure set forth in claim 7, said connection comprising a lever pivoted at one end to said chute having a portion embracing said crank shaft and connected at its upper end to said feeding means.

9. A grain dusting apparatus having in combination, a chute, a shaft extending thereacross and journaled therein having a crank portion thereon, a grain propelled wheel on said shaft, a grain hopper disposed above said chute and having a discharge opening above said wheel, a dust receptacle above said chute having a discharge outlet at its lower end, a plate spaced below and extending across said outlet, adjustable means for supporting said plate, and an actuating member secured to said plate and engaging said crank portion of said shaft for actuating said plate.

10. A grain dusting apparatus having in combination, a chute into which grain is discharged, said chute having a side adapted to be disposed alongside of a wagon body, a grain receptacle carried by said chute constructed and arranged to discharge into said chute, a dust receptacle carried by said chute constructed and arranged to feed dust into said chute, distributing and mixing means for grain and dust in said chute, and a member adapted to extend around three sides of said chute and to engage over the side of said wagon body to hold said chute and apparatus in place thereon.

11. The structure set forth in claim 10, said chute being rectangular in horizontal cross section, and said member comprising a yoke fitting around three sides of the chute extending over the side of said wagon body, and having its ends bent downwardly and engaging the inner side of said wagon body.

12. A grain dusting apparatus having in combination, a chute into which grain is discharged, said chute having a side adapted to be disposed alongside of a wagon body, a grain receptacle carried by said chute constructed and arranged to discharge into said chute, a dust receptacle carried by said chute constructed and arranged to feed dust into said chute, mixing and coating means in said chute comprising a surface over which the grain passes and a flexible member adapted to lie against said surface beneath which the grain travels.

13. The structure set forth in claim 12, said surface being inclined and said member being made of heavy fabric.

14. The combination with grain delivering and receiving hoppers, of a rotor actuated by the grain passing from the delivering to the receiving hopper and means associated with said rotor for supplying and distributing a pulverulent treatment material.

15. The combination with grain delivering and receiving hoppers, of a rotor actuated by the grain passing from the delivering to the receiving hopper and means associated with said rotor for supplying and centrifugally distributing a pulverent treatment material.

16. The combination with grain delivering and receiving hoppers, of a rotor actuated by the grain passing from the delivering to the receiving hopper and means associated with and actuated by said rotor for supplying and distributing a pulverulent treatment material.

17. The combination with grain delivering and receiving hoppers, of a rotor actuated by the grain passing from the delivering to the receiving hopper, a container for pulverulent treatment material and a feeding mechanism operated by said rotor for conveying the pulverulent material from said container to said rotor for mixing with the grain.

18. The combination with grain delivering means, of a distributor for pulverulent treatment material, including a turbine actuated by the falling grain, a conveyor operated by said turbine for conveying the treatment material thereto and means for mixing the material with said grain during the rotation of the turbine.

19. In a smut machine, a container for pulverulent treatment material, a rotor actuated by the grain and means actuated by said rotor for conveying the pulverulent treatment material thereto and for mixing this material with said grain.

20. The combination with grain delivering and receiving hoppers, of a pulverulent material distributing member arranged between said hoppers and movable by the grain passing from the delivering to the receiving hopper, and means associated with said member and controlled thereby for supplying pulverulent material thereto.

21. In combination, grain delivering and receiving hoppers, a supply of pulverulent material, a member for mixing the pulverulent material with the grain actuable by the grain passing from the delivering to the receiving hopper, and means actuated by the said member for conveying the pulverulent material from the supply to the said member.

In testimony whereof I affix my signature.

HARRY O. HENDRICKSON.